United States Patent Office 3,396,112
Patented Aug. 6, 1968

3,396,112
PROCESS OF PREPARING INORGANIC FOAMS FROM ALKALI METAL SILICATES AND ALUMINUM
Raymond C. Burrows, Minneapolis, Minn., assignor to Ashland Oil & Refining Company, Ashland, Ky., a corporation of Kentucky
No Drawing. Filed June 11, 1965, Ser. No. 463,358
6 Claims. (Cl. 252—62)

ABSTRACT OF THE DISCLOSURE

A particulate mixture of dry, water-soluble silicate and aluminum in which the weight ratio of the silicate to the aluminum is from 15:1 to 1:9 is reacted with 30 to 75 weight percent, based on the total mixture, of water to prepare an inorganic foam which comprises a matrix having the formula $Me_2O \cdot nSiO_2 \cdot Al_2O_3$ wherein Me is an alkali metal and $n$ is from 0.5 to 4, said matrix constituting at least 50 weight percent of the composition of the foam, the remainder comprising unreacted aluminum, unreacted alkali metal silicates and added inert inorganic fillers.

---

The present invention relates to inorganic foams and to a process for the preparation of inorganic foams.

Inorganic foams are highly desirable insulating materials in view of their ability to withstand extreme temperatures without decomposition. Although inorganic foams are known, such foams are extremely fragile and frequently require disadvantageously high temperatures in their manufacture. It has been attempted to overcome some of the disadvantages of inorganic foams by the incorporation of organic substituents. These, however, adversely affect the utility of the foams and elevated temperatures.

It is therefore an object of the present invention to provide inorganic foams which have high compressive strengths.

It is another object of the present invention to provide a process for the preparation of inorganic foams.

It is still another object of the present invention to provide inorganic foams free of any organic constituents.

Other objects will become apparent from the following description and claims.

The inorganic foams of the present invention are obtained by a process which comprises reacting a particulate mixture of a dry, water-soluble silicate and aluminum, in which the weight ratio of the water-soluble silicate to the aluminum is from 15:1 to 1:9, and preferably from 10:1 to 1:2, with 30–75 weight percent, based on the total mixture, of water.

The water-soluble silicates employed in the process of the present invention are alkali metal silicates having $Me_2O$ to $SiO_2$ mole ratios of 2:1 to 1:4 and preferably of 1:2 to 1:4; in which the alkali metal, Me, can be potassium, sodium, lithium, rubidium, and cesium. The preferred alkali metal silicates are those of sodium and potassium.

The silicates employed in the formation of the foams of the present invention must be dry, by which is meant that the silicates cannot contain any free water as distinguished from water of hydration or chemically bound water which can be present.

The inorganic foams obtained by the described process comprise a matrix having the formula $Me_2O \cdot nSiO_2 \cdot Al_2O_3$ wherein Me is an alkali metal and $n$ is from 0.5 to 4 and preferably from 2 to 4, said matrix constituting at least 50 weight percent of the composition of the foam, the remainder of the foam composition comprising unreacted aluminum, unreacted alkali metal silicates and added inert inorganic fillers, preferably silica.

The inorganic foams of the present invention are prepared by mixing finely-divided aluminum with finely-divided alkali metal silicate having the above-indicated composition. It is essential in order to obtain a foam of attractive properties that the alkali metal silicate contains no free water, although bound water such as water of hydration does not interfere in the formation of the desired foams. The particle size of the aluminum and the silicate should be such that both the aluminum and the silicate particles will pass a 250-mesh screen (U.S. sieve series) and preferably a 300-mesh screen.

After a uniform physical mixture of the silicate and the aluminum has been obtained, the requisite amount of water is added and the following reaction is believed to occur:

$$2Al + Me_2O \cdot nSiO_2 + 3H_2O \rightarrow Me_2O \cdot nSiO_2 \cdot Al_2O_3 + 3H_2\uparrow$$

wherein Me is the alkali metal. The water, by reacting with the aluminum and the silicate, causes hydrogen to be released which in turn causes the foaming of the reaction mixture. Since the reaction of the aluminum with water is highly exothermic, water present in the reaction mixture will become volatilized thereby increasing the foaming action and causing the foam to become dry. The reaction of the aluminum with the water and the silicate also causes the formation of the cured foam matrix having the formula $Me_2O \cdot nSiO_2 \cdot Al_2O_3$ as indicated above. Heating of the reaction mixture is not necessary in order to initiate or maintain the reaction, although heating can be employed to accelerate initiation. After the foaming and curing has been completed, as indicated by return of the reaction temperature to the starting temperature and the subsidence of foaming, it is generally advantageous to heat the resulting foam to drive off any excess water. This also appears to further cure incompletely cured foams. Drying and post-curing is generally achieved by heating the foam to temperatures of 100° to 200° C. However, vitrification or partial vitrification of the foams by heating to temperatures above 700° C. does not cause any further significant improvement in the properties of the foam, although, of course, it is not deleterious.

As will be apparent from the foregoing description, the proportions of the reagents employed in the formation of the novel inorganic foams of the present invention can differ significantly as can the specific composition of the alkali metal silicate. The amount of aluminum employed should be at least sufficient to form the indicated minimum percentage of the matrix composition. In general, however, the quantity of aluminum added will exceed the theoretical amount to complete the reaction with the silicate. It is to be recognized that in view of the atomic weight of aluminum, the weight of the quantity of aluminum employed can be lower than the weight of the quantity of silicate employed and yet be sufficient to react with all of the silicate. Commercially available aluminum powder or other forms of finely-divided aluminum having the indicated particle size can be employed, and it is not necessary for the aluminum to be pure.

The alkali metal silicates employed in the preparation of the inorganic foams of the present invention are preferably sodium and potassium silicates. Sodium and potassium silicates having the indicated $Me_2O$ to $SiO_2$ mole ratios are available commercially.

The quantity of water added to the mixture of the aluminum and silicate should be sufficient to properly wet the mixture and allow the foaming and curing reaction to proceed. Although a small excess of water does not affect the formation of the foam, a large excess is undesirable and will result in a foam of low compressive strength.

The foams obtained by the process of the present invention are reduced in density by a factor of at least five, and optimum physical properties such as compressive strength and insolubility are obtained if the density is reduced by a factor of five to ten. The uniformity of the cells obtained can be improved by the addition of a surfactant to the water before contact with the aluminum silicate mixture. The foams obtained by the described process comprise a matrix having the indicated composition which can contain unreacted starting materials. If desired, inert fillers such as silica, alumina, titania, and similar metal oxides can be added to the foam-forming composition. However, the quantity of filler should not be so high as to reduce the proportion of the matrix composition in the foam to below 50 percent by weight.

The foams obtained either with or without the subsequent heating, are characterized by high compressive strength and outstanding water resistance. The latter is observed even though the foam contains a high proportion of unreacted soluble silicate.

The formation of the foams or the present invention is further illustrated by the following examples in which all parts are by weight unless otherwise stated.

Example 1

Into an open container were charged 10 g. of aluminum powder having a particle size less than 400 mesh (U.S. sieve series) and 7.5 g. of sodium silicate having a particle size of about 200 mesh (U.S. sieve series) and a $Na_2O$ to $SiO_2$ mole ratio of 1:3.22 and containing 17 weight percent of water of hydration. The reagents were thoroughly mixed and 12.5 g. of water was stirred into the mixture until uniformly distributed. Hydrogen evolution began within 15 seconds and relatively mild foaming continued over several minutes until the mixture was dry. A vigorous reaction then raised the temperature to 105° C. and resulted in a cured foam. The density of the resulting composition was reduced by a factor of about eight. The foam was found to have a compressive strength of about 150 p.s.i., and was not affected by water after a 24-hour immersion.

The procedure was repeated except that the water was added to the silicate before the aluminum. No significant reaction was observed.

Example 2

To a dry mixture of 30 g. of 70% aluminum dross having a particle size of about 100 mesh, and 70 g. of sodium silicate having a particle size of about 200 mesh and a $Na_2O$ to $SiO_2$ mole ratio of 1:2.00 without water of hydration was added 60 g. of water. A foam formed within 30 minutes. After heating at 110° C. for three hours a cured foam having an average compressive strength of 130 p.s.i. was obtained.

The foregoing examples have illustrated the formation of the novel inorganic foams of the present invention. The procedures set forth in these examples can be employed to produce foams from other alkali metal silicates, such as potassium silicates, and fillers such as silica can be added to the dry mixture prior to reaction.

The foams of the present invention can be employed as thermal insulating materials in applications requiring retention of mechanical properties at high temperatures and resistance to oxidative degradation. The process of the present invention allows the formation of inorganic foams of intricate shapes and of large dimensions and also permits the use of simple molds.

Since many widely different embodiments of this invention may be made without departing from the spirit and scope thereof, it is to be understood that the invention is not limited to the specific embodiments herein except as defined in the appended claims.

What is claimed is:

1. The process of preparing inorganic foams which comprises reacting water with a particulate mixture of aluminum and a dry, water-soluble alkali metal silicate, the particles of said mixture passing a 10 mesh screen, the weight ratio of said alkali metal silicate to said aluminum being from 15:1 to 1:9, said alkali metal silicate having an alkali metal oxide to silica mole ratio of 2:1 to 1:4, said water constituting from 30 to 75 weight percent of the total mixture, and recovering an inorganic foam.

2. The process of claim 1 wherein the alkali metal silicate is a sodium silicate.

3. The process of claim 2 wherein the sodium silicate has a $Na_2O$ to $SiO_2$ of 1:2 to 1:4.

4. The process of claim 1 wherein the foam is post-cured by heating at a temperature of 100° to 200° C.

5. The process of claim 1 wherein the weight ratio of the said silicate to the aluminum is from 10:1 to 1:2.

6. The inorganic foam obtained by the process of claim 1.

References Cited

UNITED STATES PATENTS 2,664,405  12/1953  Anderson et al. _____ 106—75 X
3,268,350  8/1966   Grebe et al. _____ 106—75 X LEON D. ROSDOL, *Primary Examiner.*

I. GLUCK, *Assistant Examiner.*

UNITED STATES PATENT OFFICE
CERTIFICATE OF CORRECTION

Patent No. 3,396,112

August 6, 1968

Raymond C. Burrows

It is certified that error appears in the above identified patent and that said Letters Patent are hereby corrected as shown below:

Column 4, line 24, "10 mesh" should read -- 100 mesh --.

Signed and sealed this 10th day of March 1970.

(SEAL)
Attest:

Edward M. Fletcher, Jr.
Attesting Officer

WILLIAM E. SCHUYLER, JR.
Commissioner of Patents